United States Patent [19]

Danish et al.

[11] Patent Number: 5,392,338
[45] Date of Patent: *Feb. 21, 1995

[54] ENTRY OF ALPHABETICAL CHARACTERS INTO A TELEPHONE SYSTEM USING A CONVENTIONAL TELEPHONE KEYPAD

[75] Inventors: Adel Danish, Cairo, Egypt; Sherif Danish, Foster City; Kris W. Kimbrough, Redwood City, both of Calif.

[73] Assignee: Danish International, Inc., Foster City, Calif.

[*] Notice: The portion of the term of this patent subsequent to May 26, 2009 has been disclaimed.

[21] Appl. No.: 881,849

[22] Filed: May 12, 1992

Related U.S. Application Data

[63] Continuation-in-part of Ser. No. 500,370, Mar. 28, 1990, Pat. No. 5,117,455.

[51] Int. Cl.6 .......................................... H04M 11/00
[52] U.S. Cl. ...................................... 379/97; 379/354; 379/355; 379/368
[58] Field of Search ................ 379/97, 354, 355, 357, 379/368

[56] References Cited

U.S. PATENT DOCUMENTS

| | | | |
|---|---|---|---|
| 3,778,553 | 12/1973 | Rackman . | |
| 3,967,273 | 6/1976 | Knowlton | 379/97 |
| 4,191,854 | 3/1980 | Coles | 379/97 |
| 4,307,266 | 12/1981 | Messina . | |
| 4,427,848 | 1/1984 | Tsakanikas | 379/97 |
| 4,649,563 | 3/1987 | Riskin | 379/97 |
| 4,650,927 | 3/1987 | James | 379/97 |
| 4,658,417 | 4/1987 | Hashimoto et al. | 379/97 |
| 4,737,980 | 4/1988 | Curtin | 379/97 |
| 4,825,464 | 4/1989 | Wen | 379/354 |
| 5,163,084 | 11/1992 | Kim et al. | 379/97 |

Primary Examiner—James L. Dwyer
Assistant Examiner—J. M. Saint-Surin
Attorney, Agent, or Firm—James E. Eakin; Janet K. Castaneda

[57] ABSTRACT

A software driven, timing dependant method for entering alphanumerical characters using a conventional push button telephone system having automatic response functions is based upon the position (first, second or third) of each alphabetic letter upon each key of the standardized telephone keypad matrix. DTMF signals are generated following the pressing of a key to identify the key pressed and thereby generate a sequential message menu for that particular key. The key is pressed a predetermined number of times (once, twice, or three times) to select the desired letter, and the letter signals are transmitted to conventional voice tone recognition apparatus and storage facilities. The first, second and third messages on each key each consist of a silence interval segment of known length followed by, respectively, a first, second and third letter interval segment of known length. Each message may be interrupted by pressing the same, or another, key again prior to expiration of a predetermined portion of the combined message segments. Interruption of a message causes the system to rotate to the next available message. A digit is entered by pressing the desired digital key followed by pressing of "pound" sign key, or by sequentially pressing the desired digital key four times.

2 Claims, 4 Drawing Sheets

| | |
|---|---|
| A= | (2) |
| B= | (2+2) |
| C= | (2+2+2) |
| D= | (3) |
| E= | (3+3) |
| F= | (3+3+3) |
| G= | (4) |
| H= | (4+4) |
| I= | (4+4+4) |
| J= | (5) |
| K= | (5+5) |
| L= | (5+5+5) |
| M= | (6) |
| N= | (6+6) |
| O= | (6+6+6) |
| P= | (7) |
| Q= | (1) |
| R= | (7+7) |
| S= | (7+7+7) |
| T= | (8) |
| U= | (8+8) |
| V= | (8+8+8) |
| W= | (9) |
| X= | (9+9) |
| Y= | (9+9+9) |
| Z= | (1+1) |
| 1= | (1+#) |
| 2= | (2+#) |
| 3= | (3+#) |
| 4= | (4+#) |
| 5= | (5+#) |
| 6= | (6+#) |
| 7= | (7+#) |
| 8= | (8+#) |
| 9= | (9+#) |
| 0= | (0+#) |
| SPACE=(0) | |

*FIG.-3*

ENTRY OF ALPHABETICAL CHARACTERS INTO A TELEPHONE SYSTEM USING A CONVENTIONAL TELEPHONE KEYPAD

RELATED APPLICATIONS

This application is a continuation in part of U.S. patent application Ser. No. 07/500,370, filed Mar. 28, 1990, now U.S. Pat. No. 5,117,455, issued on May 26, 1992.

FIELD OF THE INVENTION

The present invention relates to a method for inputting characters into a telephone system using the existing telephone keypad. The invention finds special application for using a push button telephone to input letters of an alphabet.

BACKGROUND OF THE INVENTION

The alphanumeric telephone keypad matrix is known in the art. The universally recognized standard for the push button telephone keypad is a 4×3 matrix having four rows and three columns of buttons, or keys Each key (except the "1" *, # and "0" keys) is preassigned with a single digit or special symbol as a primary assignment, and with three alphabetic characters as a secondary functional assignment.

Automatic response function telephone systems, computerized systems, are designed to route incoming calls from pay or non-pay calling stations to a computer. An incoming call is received and processed by the computer which typically prompts the caller to select the desired service by pressing numeric keys on the telephone keypad. The identity of each numerical key is determined from an analog, dual tone multifrequency signal (DTMF) which is generated upon depressing the numerical key. The DTMF is a combination of two analog voice frequency tones, and it addresses stored digital code. Timing is typically not critical in the entry of DTMF signals for the identification of the numerals of standard, numerical keys. The computer converts the analog DTMF tones into digit signals for processing. The computer may also convert digit signals into analog voice signals for providing acknowledgement/prompt messages to the caller.

For example, by pressing the numeral 1 on the keypad in response to a computerized voice prompt, the caller may be connected to the technical support department, or by pressing the 0 on the keypad, the caller may be connected to an operator for further assistance. Computerized telephone systems may also eliminate voice communication and require the caller to communicate exclusively through the telephone keypad. In one such application wherein a caller desires that information be delivered by facsimile, the caller may press the number key corresponding to the number of the desired document and, upon entry of the start button or the receiving facsimile number, the document will be delivered.

Entry of the letters of the alphabet is desirable for many reasons and purposes, including automatic response function telephone systems. For example, the caller's name and address may be needed to complete a telephone transaction.

While the universally recognized 4×3 keypad of the prior art standardizes the physical arrangement of the numeric characters, the physical arrangement of alphabetic characters may vary. One typical push button telephone matrix of the prior art includes twenty four letters of the alphabet, excluding the "Q" and the "Z" arranged on eight of the twelve keys as follows:

| KEY 1 | No letters |
|---|---|
| KEY 2 | ABC |
| KEY 3 | DEF |
| KEY 4 | GHI |
| KEY 5 | JKL |
| KEY 6 | MNO |
| KEY 7 | PRS |
| KEY 8 | TUV |
| KEY 9 | WXY |
| KEY 0 | No letters |
| KEY * | No letters |
| KEY # | No letters |

There are several methods of entering alphabetical characters using the conventional telephone keypad design outlined above. None of the methods provides for the DTMF signal entry of alphabetical characters.

The first method requires the caller to locate the desired letter on the telephone keypad, press the corresponding key either once, twice, three, or four times, depending upon the location of the desired letter on the key, and then to press the a symbol key, such as the pound sign key, which operates as a signal code to indicate the desire to enter a character as opposed to a digit. This method is shown in the Hashimoto et al. U.S. Pat. No. 4,658,417. For example, to enter the name "JONES" using the Hashimoto method, the following steps are required:

| "J" | KEY 5 | Press twice |
|---|---|---|
|  | # KEY | Press once |
| "O" | KEY 6 | Press four times |
|  | # KEY | Press once |
| "N" | KEY 6 | Press three times |
|  | # KEY | Press once |
| "E" | KEY 3 | Press three times |
|  | # KEY | Press once |
| "S" | KEY 7 | Press four times |
|  | # KEY | Press once |

Because a separate symbol key, such as the pound sign key, must be pressed before entry of the next desired letter, the caller's concentration on the word to be communicated is interrupted after entry of each letter within the word. Considerable concentration is required to correctly complete the desired entry.

A second method for entering letters of the alphabet requires the caller to locate and press the key bearing the desired letter and then to press the key bearing the numeral corresponding to the position of the desired letter on the key. For example, to enter the letter "H", the caller must first press the number four key which bears the letter "H", and must then press the number two key because the "H" is the "second" letter on the number four key. The following steps are required to enter the name "JONES" using the second method:

| "J" | KEY 5 | Press once |
|---|---|---|
|  | KEY 1 | Press once (Pause) |
| "O" | KEY 6 | Press once |
|  | KEY 3 | Press once (Pause) |
| "N" | KEY 6 | Press once |
|  | KEY 2 | Press once (Pause) |
| "E" | KEY 3 | Press once |
|  | KEY 2 | Press once (Pause) |
| "S" | KEY 7 | Press once |

| | |
|---|---|
| -continued | |
| KEY 3 | Press once |

Although the second method standardizes the number of keystrokes for each letter, the user's concentration is interrupted be the requirement to press a digital key between letters. Considerable concentration is required to properly complete the required keystrokes.

As can be seen from the above summary of the prior art, an unsolved need exists for a simple method for inputting alphabetical characters into a telephone system using the existing telephone keypad.

SUMMARY OF THE INVENTION WITH OBJECTS

A general object of the invention is to provide a method for inputting alphabetical characters into a telephone system in a manner that overcomes the limitations and drawbacks of the prior art.

A specific object of the present invention is to provide a method for using a standard telephone keypad for full alphabetic DTMF entry.

Yet one more object of the present invention is to enable a caller to apply a minimum of concentration while using a rapid, simple timing method for entering characters into a telephone system in a manner that is dependent only upon the physical location of the characters on the keys of the keypad.

Still another object of the present invention is to provide a computer program for a voice prompted method based upon timing to enter alphabetical characters into a telephone system using a conventional keypad.

In accordance with the present invention, a computer program is provided for a timing dependant method for full alphanumeric DTMF entry using a standard push button telephone keypad. The standard 4×3 keypad consists of four parallel, horizontal rows each having three axially aligned keys, the axially aligned keys forming three vertical columns. The letters of the alphabet are conventionally and progressively arrayed as triads on the keys across the horizontal rows and beginning with the second key in the first horizontal row. The letters Q and Z are assigned to the number 1 key, and a space is assigned to the "0" key.

The method is software driven, timing dependant, and based upon the position (first, second or third) of each alphabetic letter upon each key of the standardized telephone keypad matrix. DTMF signals are generated following the pressing of a key to identify the key pressed and thereby generate a sequential message menu for that particular key. The key is pressed a predetermined number of times (once, twice, or three times) to select the desired letter, and the signals are transmitted to conventional voice tone recognition apparatus and storage facilities.

The method accurately measures the pause between keystrokes by playing a message of known length immediately after the selected key is pressed once. Each message consists of two segments: a silence interval segment and a letter interval segment. The first message includes a silence interval of known length followed by a first letter interval of variable known length, the first letter interval representing the first letter appearing on the selected key. The first message, or any message, may be interrupted by pressing the same key again prior to expiration of a predetermined amount of the combined segments of the first message. If the user desires to enter the first letter on the selected key, the key is pressed only once, the silence interval passes, the first letter interval passes, and the preprogrammed first letter signal ensues thereby entering into the telephone system the letter occupying the first position on the selected key. To enter a letter occupying the second position on the key, the user presses the key twice. When the key is timely pressed a second time, the first letter message is interrupted which causes the second letter message to immediately play. If the key is not pressed again during the predetermined portion of the second timed message, the second letter will be entered. Entry of the letter in the third position requires that the key be pressed timely and sequentially three times to interrupt the first letter message and then the second letter message. All alphabetical characters are entered by pressing the selected key once, or sequentially twice or three times.

Two methods may be used to enter a digital character contained within a alphabetical character set. In the first preferred method, the selected digital key is pressed followed by the pressing of a symbol key, preferably the "pound" sign key within a predetermined time interval. In the second method, the key is sequentially pressed four times to generate a fourth message with a digital interval.

These and other objects, aspects, advantages and features of the present invention will be more fully understood and appreciated upon consideration of the following detailed description of a preferred embodiment, presented in conjunction with the accompanying drawings.

BRIEF DESCRIPTION OF THE DRAWINGS

FIG. 3 is a table showing the entry sequence for each of the alphanumeric characters shown on the keys in FIG. 2.

DETAILED DESCRIPTION OF A PREFERRED EMBODIMENT

Figure 1:
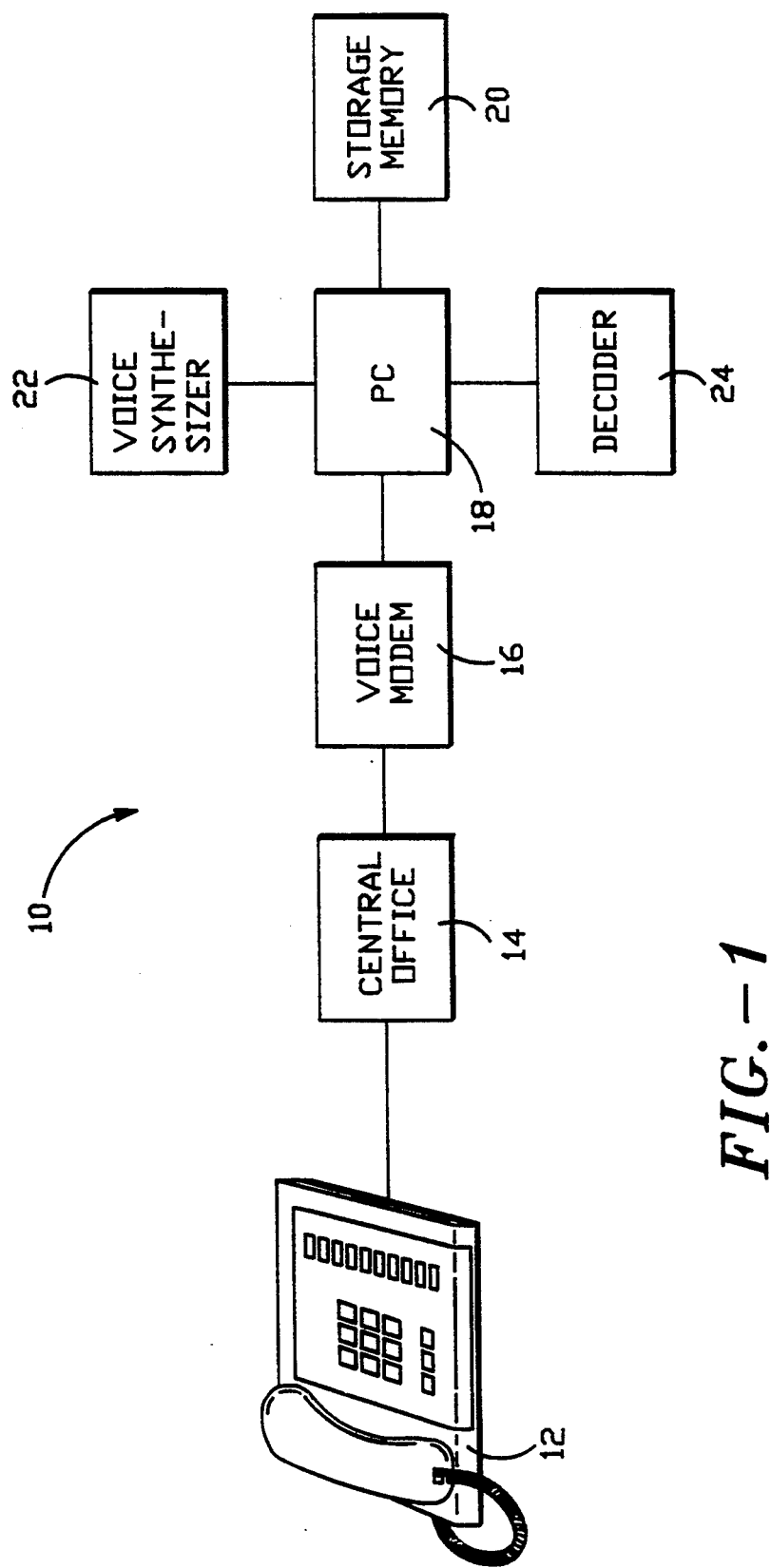
FIG. 1 is a block diagram of a conventional automatic response function telephone system having a 4×3 matrix keypad.

FIG. 1 is a block diagram of the components of a conventional automatic response function telephone system accessible from pay or non-pay calling stations and generally represented by the reference number 10. System 10 includes a user telephone hand set 12 which is a typical twelve key, push button telephone having a 4×3 matrix keypad. Pressing the keys on the hand set 12 produces voice, DTMF signals to identify the selected keys.

The hand set 12 is connected to a privately or centrally operated telephone office 14. A voice modem module 16 is included for providing voice prompts to the caller. The voice module 16 is connected to, or typically installed within, a conventional digital computer 18 having a storage memory 20, a voice synthesizer 22, and a decoder 24.

The memory 20 contains stored codes corresponding to DTMF signals for each of the keys of the hand set 12. The stored codes are used by the computer as a look-up table. The decoder 24 uses the stored codes to convert the analog DTMF signals into digital data for processing and storage. System 10 further generates responsive voice messages by converting stored digital code into analog signals.

Figure 2:
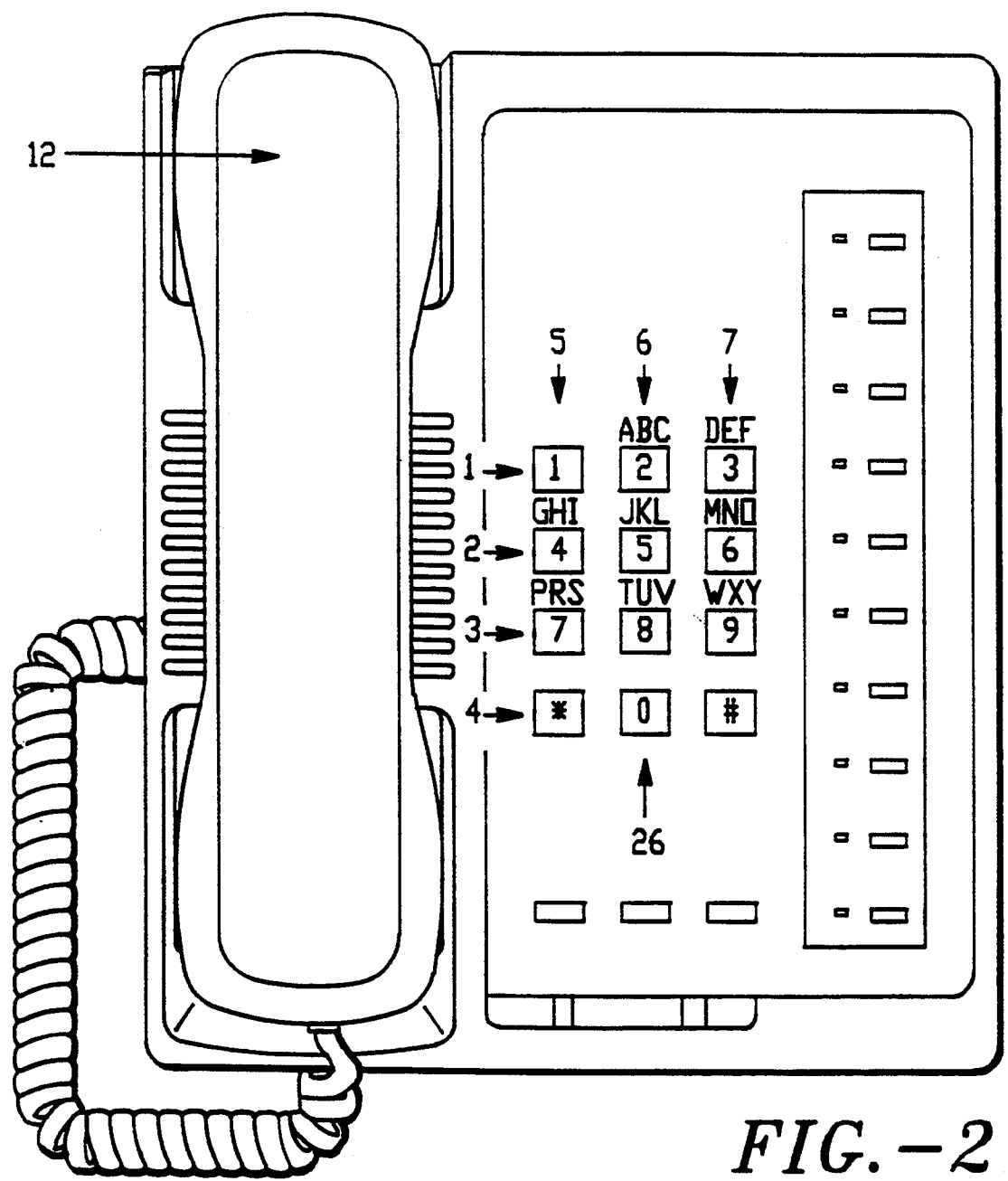
FIG. 2 is a top plan view of a conventional push button telephone set showing a standard 4×3 matrix keypad in detail with the letters arrayed on the keys.

Referring now to FIG. 2, the hand set 12 is shown having a standardized twelve key, push button keypad 26. The twelve keys of keypad 26 are arrayed in the universally recognized 4×3 rectangular matrix which divides the twelve keys into four equidistant and parallel, horizontally arrayed rows 1,2,3, and 4 having three keys in each row. The three aligned keys in each row 1-4 are equidistant and form three vertically arrayed columns 5,6 and 7. Beginning at the first key in row 1, continuing along row 1 and back to the first key in row 2 and so forth, the twelve keys are consecutively numbered from 1 through 9. The "star" key, zero key and pound sign key occupy the three keys in row 4. It will be recognized by those skilled in the art that other key pad arrangements are used and that the matrix of the present invention may be adapted for use with other keypad configurations.

The 26 letters of the English alphabet are progressively prearranged three to a key on the twelve keys of the keypad 26. The "Q" and "Z" are assigned to the number 1 key, and a space is assigned to the "0" key. Optional special characters, such as a period, a hyphen, and a question mark may be assigned to the "0" and/or number 1 key if desired.

In addition to storing codes for converting the analog voice signals to digital signals, stored digital files may be converted to analog voice signals in order to enunciate a message back to the user, for example to signal the user that the correct key sequence has been entered. Known programs and hardware are used to accomplish the digital voice storage capability, for example, voice boards from Dialogic Corporation and corresponding software are used to provide the digital codes. The system is an IBM compatible system.

In accordance with the principles of the present invention, the software or firmware is programmed to provide digital code characters for each letter of the alphabet. The software of the system is preferably written in Microsoft C language and is compatible with the voice board of Dialogic Corporation. The digital code characters are stored in the decoder 24 of system 10. Each letter is defined and coded into memory using the physical location of the particular character on its particular key (first, second, or third). All of the alphabetical characters contained on the keypad 26 are entered by pressing the corresponding key once, or sequentially twice or three times as shown in FIG. 3.

The DTMF signal recognition feature of the invention requires that the system accurately time the interval between keystrokes. The program provides a distinct output signal for each letter associated with a particular DTMF signal key. The output signal is generated from an index message associated with each letter and immediately activated by pressing a corresponding key. Each index message consists of two segments: a constant, timed silence interval segment followed by a variable, timed letter interval segment. There are at least three index messages associated with each key, and each silence interval segment is 0.5 seconds in length. The index messages associated with each key are progressively activated and played as the associated key is sequentially pressed.

Figure 4:
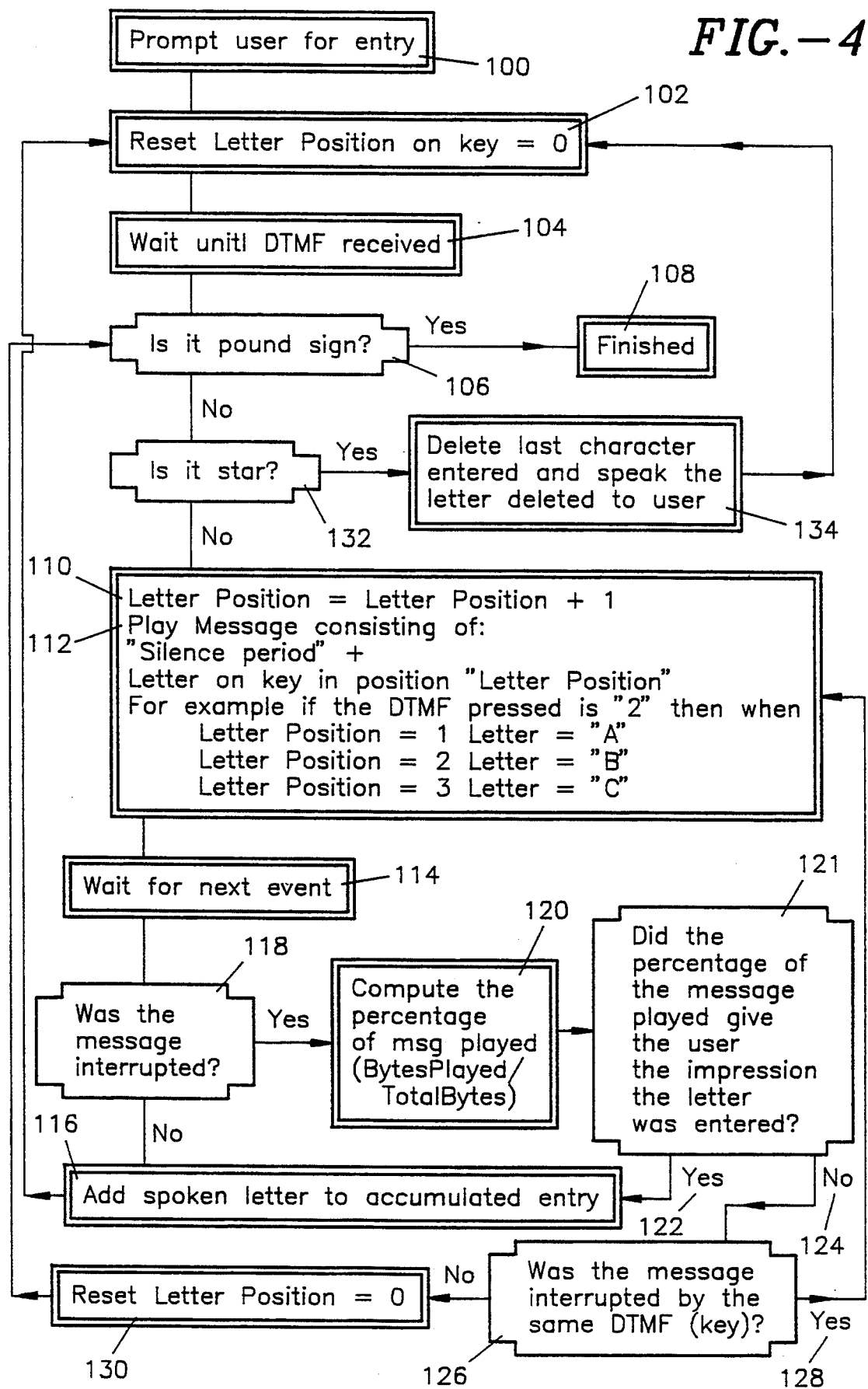
FIG. 4 is a flow chart showing the programmed sequence of events to enter alphabetical characters.

Referring now to FIG. 4, a typical program sequence is illustrated for entry of alphabetical letters following connection to the system 10. At step 100 following connection to the system 10, the voice prompt feature is activated to request the user to enter the desired information, such as a name. Activation of the voice prompt feature causes the index messages on all twelve keys to reset to the first message on each key in step 102. At step 104, the system waits for the user to select a letter or digit by pressing a key. The entry is received at step 106 and the system determines whether the pound sign has been received thereby bypassing the alphabetic entry phase in step 108.

When a key other than the pound sign is initially pressed once at step 104, the DTMF signal for that key is received at step 110 thereby notifying the system that the user may wish to enter one of the three letters on the pressed key.

The first index message associated with the first of the three letters on the pressed key is immediately initiated at step 112 following identification of the DTMF signal for that particular key at step 110.

The two known, timed segments of each index message, consist of the 0.5 second silence interval and a variable letter interval of approximately 0.5 seconds, the letter intervals varying and set in accordance with speech patterns to reflect the time necessary to speak the desired letter. The timed silence interval is necessary to prevent unwanted entry of a letter by allowing the user time to press the key again when the user desires to enter the second or third letter on the key. The known total length of each index message in bytes and time permits measurement and calculation of the percentage of each index message played in the event the message is interrupted.

The silence interval of the first index message per key begins at step 112 as the message is activated and occurs during step 114. If the key is not pressed again during the 0.5 second timed silence interval of the first letter index message at step 114, and the entire timed letter interval of the first letter index message passes, so that the maximum combined message bytes were played, a signal representing the first letter on the key is generated at step 116.

If at step 118 the key is pressed again during the timed first index message, the index message is interrupted by an additional DTMF signal for that key. At step 120 the system calculates the percentage of the first index message played in bytes by dividing the number of bytes played by the maximum number of bytes for the first index message. If at least 67 percent of the combined message (silence interval plus the letter interval) was played, the system assumes the user meant to enter the first letter on the key at step 121. The first letter is then added to the input buffer at step 122. The selected 67 percent value is based upon completion of the entire 0.5 second silence interval and from approximately 5 to 20 percent (5%-20%) of the variable letter interval.

If less that 67 percent of the combined index message was played, the system assumes at step 124 that the user did not wish to enter the first letter on the key. At step 126, the system determines whether the same key was pressed a second time thereby generating the same DTMF signal for the key. If the same key was pressed, the system assumes at step 128 that the user wished to enter the second or third letter on the key. Step 112 is again initiated and the system rotates to the next possibility causing the second letter index message to immediately play. If the key is not pressed again during the timed second letter index message, a signal representing the second letter on the key is generated following play of the timed letter interval segment. Steps 114 to 128 are repeated, and step 112 is again initiated if the user presses the same key for the third time prior to playing 67 percent of the second combined index message. When the same key is pressed for the third time during the second index message, the index message for the third letter on the key is immediately played. If the key is not pressed again, a signal representing the third letter on the key is generated following play of the letter interval segment.

If the same key is pressed a fourth time during the third timed index message, the system rotates back to the first letter message on the key.

When an index message is interrupted by pressing another key, step 130 is initiated and the messages are reset to begin at the first letter index message for all keys. As shown in step 116, 120 and 121, the letter associated with the interrupted message will be entered if 67% of the message elapsed prior to interruption, and the system will rotate to step 106 to determine whether the new key pressed is the pound sign. When the new key pressed is other that the pound sign, step 110 is initiated and continued as described above until another key is entered or the pound sign is pressed.

As shown in step 132, entry letters are corrected by pressing the star key, "*". By pressing the star key once, the last character entered is deleted at step 134 and the letter position on the keys is reset to zero and step 102. Pressing the star key twice cancels the entire sequence of entered alphanumeric characters thereby permitting the user to begin again.

The entry of a letter is viewed as logical by the user in that it is dependent only upon the position of the character upon the key. The sequences for entering all of the characters shown on the keypad 26 are included in table form in FIG. 3. It will be recognized that sequential keystrokes are required to enter the second and third letters of the alphabet on each key.

In the preferred embodiment, numerical characters are entered by pressing the key bearing the number followed by pressing a symbol key, preferably the pound sign key, thereby causing step 108 to be entered after each digital selection to bypass the alphabetical program steps.

Alternatively, numerical characters may be entered by pressing the key bearing the number four times to enter a fourth, numerical index message to generated a digit signal.

The present invention permits the user to enter alphabetical and numeric characters within the same set of characters, for example, to enter a credit card number containing both letters and numbers. To enter the numeric character, the corresponding numeric key is pressed followed by the pressing of the "pound" sign key, or alternatively, by pressing the desired numeric key four times.

In accordance with another aspect of the present invention, programming creates intelligent voice cards which directly echo the selected character back to the user without the necessity for prior decoder conversion and reconversion.

Industrial Applicability

The present invention may be used in the international telephone communications industry. The present invention finds special application for telephone systems providing stock and commodity market information, merchandise and pricing information, name/address data entry for ordering services, weather information, telephone directory information, and travel information. The invention may also be used to access a desired individual by entry of a name, or to access data bases for word searches.

Although the presently preferred embodiment of the invention has been illustrated and discussed herein, it is contemplated that various changes and modifications will be immediately apparent to those skilled in the art after reading the foregoing description in conjunction with the drawings. Accordingly, it is intended that the description herein is by way of illustration and should not be deemed limiting the invention, the scope of which being more particularly specified and pointed out by the following claims.

What is claimed is:

1. A system for entering alphanumeric characters into a telephone station, the system comprising:
at least one telephone set having a push-button keypad, the keypad preconfigured so that each alphabetic character occupies a first, second or third site on one of a plurality of push button keys on the keypad, depressing a key, once for the first character in sequence associated with that key, twice for the second character in sequence associated with that key, three times for the third character associated with that key, and N times for the Nth character, if any, associated with that key, generating a dual tone multifrequency signal, the system comprising:
an assigned signal code for each alphanumeric character, each signal code having a maximum time period between the first instance in which a specific key is actuated and subsequent actuations of the same key before a character associated with that key is selected;
a computer responsive to dual tone multifrequency signals and having means for converting said signals into digital signals;
means for storing codes corresponding to the dual tone multifrequency signals; and
means for converting the digital signals into voice signals for announcing alphanumeric characters back to a user.

2. The system of claim 1 further comprising means for echoing character selection back to the user without the necessity for signal conversion.

* * * * *